United States Patent [19]
Price et al.

[11] Patent Number: 6,144,857
[45] Date of Patent: *Nov. 7, 2000

[54] CELLULAR COMMUNICATIONS SYSTEMS

[75] Inventors: David Price, Reading; Ronald James Maginley, Maidenhead, both of United Kingdom

[73] Assignee: Nortel Networks Corporation, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/884,309

[22] Filed: Jun. 27, 1997

[30] Foreign Application Priority Data

Jun. 27, 1996 [GB] United Kingdom .................... 9613572

[51] Int. Cl.⁷ ...................................................... H04Q 7/20
[52] U.S. Cl. ........................... 455/445; 455/435; 455/514
[58] Field of Search ..................................... 455/445, 435, 455/433, 514, 422

[56] References Cited

U.S. PATENT DOCUMENTS

| | | | |
|---|---|---|---|
| 5,711,002 | 1/1998 | Foti | 455/433 |
| 5,761,500 | 6/1998 | Gallant et al. | 395/610 |
| 5,854,982 | 12/1998 | Chambers | 455/445 |
| 5,878,348 | 3/1999 | Foti | 455/434 |

*Primary Examiner*—Daniel S. Hunter
*Assistant Examiner*—Darnell R. Armstrong
*Attorney, Agent, or Firm*—Lee, Mann, Smith, McWilliams, Sweeney & Ohlson

[57] ABSTRACT

In a mobile telephone network, a home location register (HLR) is provided with one or more cascaded home location registers to which some of the subscribers are allocated so as to share the workload in processing the subscriber information requests that are involved in the setting up of calls. Routing of requests to the correct HLR is simplified by routing all such requests to the original or master HLR and forwarding only those requests for which data is stored on one of the back-up or cascaded HLRs. This avoids the need for changes in the existing system routing plan. In a further embodiment two HLRs may form a mutually boosting pair.

12 Claims, 10 Drawing Sheets

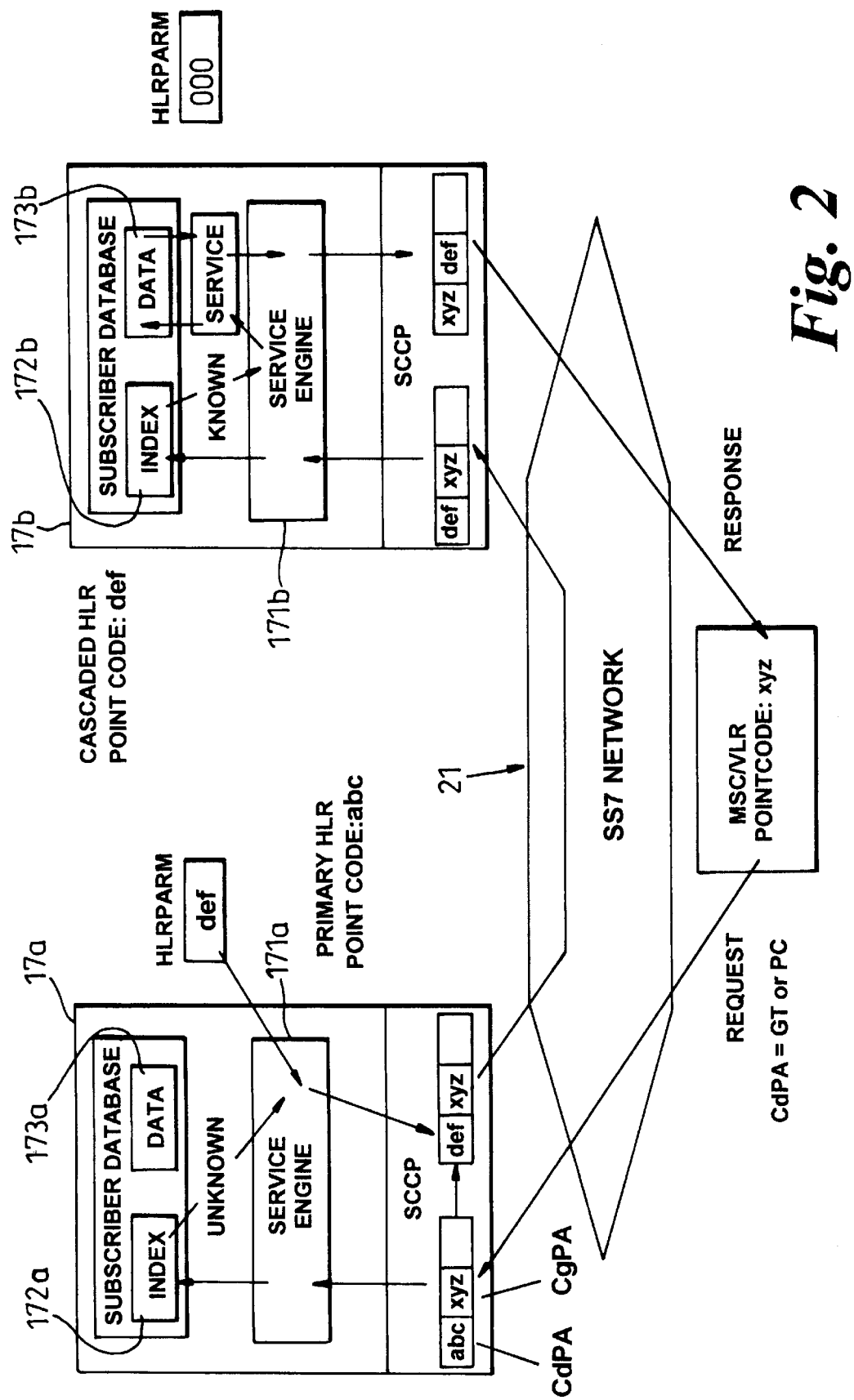

PRIMARY HLR PROCESSING LOGIC

| SUBSCRIBER STATUS (ISTATUS) | | PRIMARY HLR ACTION |
|---|---|---|
| ACTIVATED (A) | | PROCESS REQUEST |
| NEW/NAUGHTY (N) | UNRESTRICTED REQUEST | PROCESS REQUEST |
| | RESTRICTED REQUEST | RETURN UNKNOWN SUBSCRIBER ERROR |
| REPLACEMENT (R) | | PROCESS REQUEST |
| DEACTIVATED (D) | | RE-ROUTE TO CASCADED HLR |
| SUBSCRIBER NOT IN THE DATABASE | | RE-ROUTE TO CASCADED HLR |

*Fig. 3*

NORMAL / CASCADED HLR PROCESSING LOGIC

| SUBSCRIBER STATUS (ISTATUS) | | CASCADED HLR ACTION |
|---|---|---|
| ACTIVATED (A) | | PROCESS REQUEST |
| NEW/NAUGHTY (N) | UNRESTRICTED REQUEST | PROCESS REQUEST |
| | RESTRICTED REQUEST | RETURN UNKNOWN SUBSCRIBER ERROR |
| REPLACEMENT (R) | | PROCESS REQUEST |
| DEACTIVATED (D) | | RETURN UNKNOWN SUBSCRIBER ERROR |
| SUBSCRIBER NOT IN THE DATABASE | | RETURN UNKNOWN SUBSCRIBER ERROR |

*Fig. 4*

CELLULAR COMMUNICATIONS SYSTEMS

BACKGROUND OF THE INVENTION

A number of cellular communications systems are currently being installed to provide communications facilities to mobile terminals. In such systems, mobile terminals are served by base stations via a radio or air link, each base station defining a system cell. In order that a subscriber may be identified as an authorised system user and located so as to receive calls or other system services, the system is provided with a central database containing subscriber information which can be accessed as required. In the standardised European system commonly referred to as the GSM system, this central store is known as the home location register (HLR). The number of subscribers to mobile communications systems is rapidly increasing, and service providers are becoming concerned that their systems should have sufficient capacity to accommodate these subscribers. A particular problem is the need to store information relating to subscribers on the system home location register, as it will be appreciated that the installed storage capacity of a home location register is finite. Although systems have been designed to allow for future expansion, the unexpected growth in the number of mobile subscribers will soon exceed the storage limits of the present home location registers. One solution to this problem is the installation of a larger home location register to replace existing equipment. However, this is generally undesirable both on the grounds of cost and the possible system disruption that can occur during installation. An alternative solution is the provision of second home location register to which new subscribers are allocated when the existing register becomes full thus effectively doubling the storage capacity. It has been found however that this introduces a routing problem as each request then requires the inclusion of a code indicating the identity of the particular home location register to which the subscriber has been allocated. This requires modification of the network routing tables to accommodate this additional information and can lead to a complex routing which is difficult to manage.

SUMMARY OF THE INVENTION

The object of the invention is to minimise or to overcome this disadvantage.

It is a further object of the invention to provide an improved system and method for increasing the subscriber data storage capacity of a cellular communications network.

According to one aspect of the invention there is provided a method of routing subscriber information requests in a cellular communications network incorporating a first home location register and one or more further home location registers on which registers subscriber data is stored, the method including routing all said requests to the first home location register, responding from the first home location register to a said request when the subscriber data relating to that request is stored on the first home location register, and forwarding a said request from the first home location register to a said further home location register when the subscriber data is not found on the first home location register.

According to another aspect of the invention there is provided a mobile communications system incorporating a first home location register and one or more further home location registers on which subscriber data is stored, means for routing requests for subscriber data to the first home location register, means associated with the first home location register for responding to a said request when the data for the respective subscriber is stored on the first home location register, and further means associated with the first home location register for forwarding a said subscriber data request to a said further home location register when the data for the respective subscriber is not stored on the first home location register.

According to a further aspect of the invention there is provided a home location register arrangement for a mobile communications system, the arrangement comprising a first home location register on which subscriber data relating to some system subscribers is stored and to which, in use, requests for subscriber data are routed, and one or more further home location registers on which subscriber data relating to other system subscribers is stored, the arrangement incorporating means associated with the first home location register for responding to a said request when the data for the respective subscriber is stored on the first home location register, and re-routing means associated with the first home location register for forwarding a said subscriber data request to a said further home location register when the data for the respective subscriber is not stored on the first home location register.

The technique obviates the need for identifying prior to routing of a request which home location register should be accessed to retrieve data for any particular subscriber. Further, the second or cascaded home location register can be introduced to an existing system on a retrofit basis without the need to alter the system request routing plan. All requests are routed in the first instance to the first home location register irrespective where the subscriber data is currently stored. This not only simplifies the request routing but also introduces flexibility to the system as subscribers can be reallocated from one home location register to another, e.g. to effect load sharing, without the need for any changes in the system routing plan.

BRIEF DESCRIPTION OF THE DRAWINGS

Embodiments of the invention will now be described with reference to the accompanying drawings in which:

FIG. 2 illustrates the interconnection between a mobile switching centre and the primary and cascaded home location registers of the system of FIG. 1;

FIGS. 3 and 4 illustrate the message processing logic of the primary home location register and the cascaded home location register respectively;

DESCRIPTION OF PREFERRED EMBODIMENT

Figure 1:
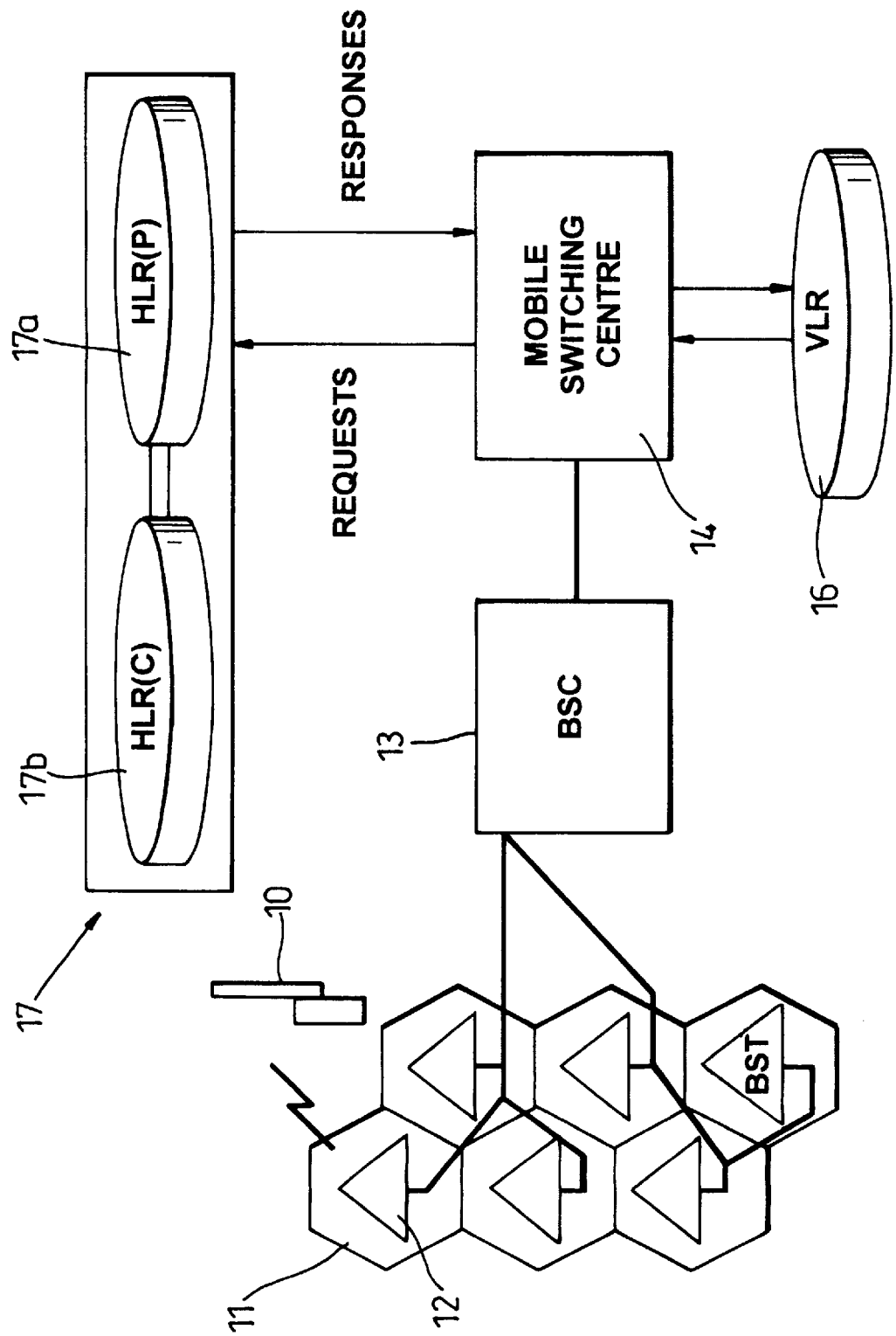
FIG. 1 is a schematic diagram of a mobile communications system incorporating a primary home location register and a secondary or cascaded home location register.

Referring to FIG. 1, there is depicted in highly schematic form part of a mobile cellular communications network or system. The service area of the system is subdivided into a plurality of contiguous cells 11 in each of which mobiles 10 are serviced via a respective base station 12. Operation of a group of base stations 12 is controlled via a base station controller 13 and, in turn, a number of base station controllers are serviced by a mobile switching centre (MSC) 14 which may provide an interface to the public telecommunications network (not shown). Within this arrangement, the mobile switching centre 14 may service, via the base station controllers 13 and the base stations 12, typically over one hundred individual cells 11. Information relating to the mobiles 10 within the service area of the mobile switching centre 14 is stored in a visitors location register (VLR) or database 16 associated with the mobile switching centre.

The system also incorporates a master database 17 of subscriber information. This master database comprises a primary or diverting home location register (HLR) 17a and a secondary or cascaded home location register 17b. Each system subscriber is allocated to one or other of the home location registers. When a mobile terminal enters the service area of the MSC 14, it registers with that MSC. As part of the registration procedure, information or data relating to that mobile is retrieved by the MSC from the home location register and stored in the visitors location register. In this way, the system is constantly updated with the current location of each mobile terminal so that calls to that mobile can be routed to the correct mobile switching centre.

In the GSM, DCS-1800 and PCS-1900 schemes a subscriber is identified using two unique identities. The International Mobile Subscriber Identity (IMSI) is used for non-call related requests to the HLR typically from the VLR, for example location updating. The IMSI is held in the subscriber identity module (SIM) of the mobile station, typically on a 'SIM card' and is not visible nor accessible to the subscriber. The Mobile Subscriber ISDN (MSISDN) is used for call related request to the HLR typically from the MSC, for example "Send Routing Information". The MSISDN is associated with a teleservice in the HLR and is visible to caller and subscriber as the 'dialled number'. An MSC originated message will only carry an MSDISDN and will not carry an IMSI. Similarly, a VLR oroginated message will only carry an IMSI and not an MSISDN.

Thus, requests to the HLR from the network will be based on either the IMSI or MSISDN. However the important point to note is that it is relatively easy for an operator to change a subscriber's IMSI but very disruptive to change the MSISDN. A second important point is that from the network perspective there is no intrinsic relationship between an IMSI and a MSISDN other than routing derived from them should result in a message arriving at the same HLR for the same subscriber they refer to.

If we now examine the role of the cascade mechanism, the arrangement shown in FIG. 1 enables the second or cascaded HLR node to be added to the network to increase subscriber storage and subscriber transaction capacities whilst minimising necessary changes to routing specifications in the network.

When the second or cascaded HLR (C) is added to the system, some subscribers are moved from node P to node C. At this point all requests, both IMSI and MSISDN based, will still be routed by the network to HLR node P. The cascade mechanism is used in node P to re-route messages to node C where the specified subscriber is not known in node P. At the primary HLR, the global title address of the cascaded HLR is datafilled in the HLR parameter table and the re-routing function is then activated. We have found that specification of the cascaded HLR address as a global title rather than a point code enables simple cross checking to be put into effect. When message re-routing is required, the primary home location register reconstructs the original TCAP message and then places the cascaded home location register number from table GHLRPARM in the called party address (CdPA). The calling party address (CgPA) is preserved and still indicates the original requester. Once the message has been re-routed, the primary HLR is no longer involved in the transaction. All responses which are based on the calling party address are returned directly to the original requester.

When the request arrives at node C, if the subscriber is not known then an 'unknown subscriber' response is returned to the originating MSC or VLR. If the subscriber is known the request is processed normally and the response returned to the originating MSC or VLR.

Whilst the cascade mechanism does ensure that requests eventually arrive at the correct HLR node, the primary node (P) must perform additional processing which can require in the order of 30% of available processor resources. Thus adding a second HLR while using the booster mechanism would offer at most 70% additional transaction capacity rather than an additional 100%.

Referring back to the earlier description of the IMSI offers a means to reduce this re-routing overhead. The operator is able to change a subscriber's IMSI without effecting the service to the subscriber or callers. Thus the operator can change the IMSIs of subscribers who have been moved to node C such that network routing translations can be economically changed to route IMSI based traffic direct to node C. Note that MSISDN traffic would still be routed to node P, however IMSI based traffic can account for 50% or more requests to an HLR. Alternatively, the operator could simply move subscribers from node P to node C in blocks of contiguous IMSI ranges and achieve the same result without having to re-issue SIM cards.

Of course, new subscribers could simply be issued with SIM cards carrying IMSIs which are routed directly to node C.

It is preferred not to re-route messages more than once as each cascade step adds increased processing and transmission and therefore adds an increased time delay to the eventual response.

After the first response in a transaction from the cascade HLR to the originating MSC or VLR, further messages from that MSC or VLR relating to the same transaction can use the HLRs address (received as the CgPA in the response) as the CdPA of a request, and so be routed by network translations directly to the cascade HLR.

Referring now to FIG. 2, this illustrates the communications paths between the mobile network MSC and the primary and cascaded home location registers. Communication is effected across a fixed network 21 which typically employs a SS7 signalling protocol in which each system entity is allocated a unique point code or party address which is used for controlling message routing. In the arrangement shown in FIG. 2, all requests for subscriber data are allocated the point code (abc) of the primary home location register 17a and are thus routed to that home location register for processing. Within that home location register the service engine 171a determines from an index 172a provided as part of the subscriber database whether or not the subscriber to whom the request relates is registered with that home location register. If the subscriber is found on the index, the relevant data is retrieved from subscriber data 173a and is processed by the service engine which controls routing of a response to the MSC 14 using the point code (xyz) of the MSC.

If however the subscriber is not found in the index 172a, and is thus not registered with the home location register 17a, the service engine routes the corresponding request via the network 21 to the cascaded home location register using the point code (def) of that register. When the request is received by the cascaded home location register, its service engine determines from index 172b whether or not the subscriber to whom the request relates is registered with the cascaded home location register.

After the first response in a transaction from the cascade HLR to the originating MSC or VLR, further messages from that MSC or VLR relating to the same transaction can use the HLRs address (received as the CgPA in the response) as the CdPA of a request, and so be routed by network translations directly to the cascade HLR.

The primary and cascaded home location registers can be considered logically as a single database. Accordingly, data relating to any one system subscriber should preferably not reside on both home location registers at the same time.

Figure 5:
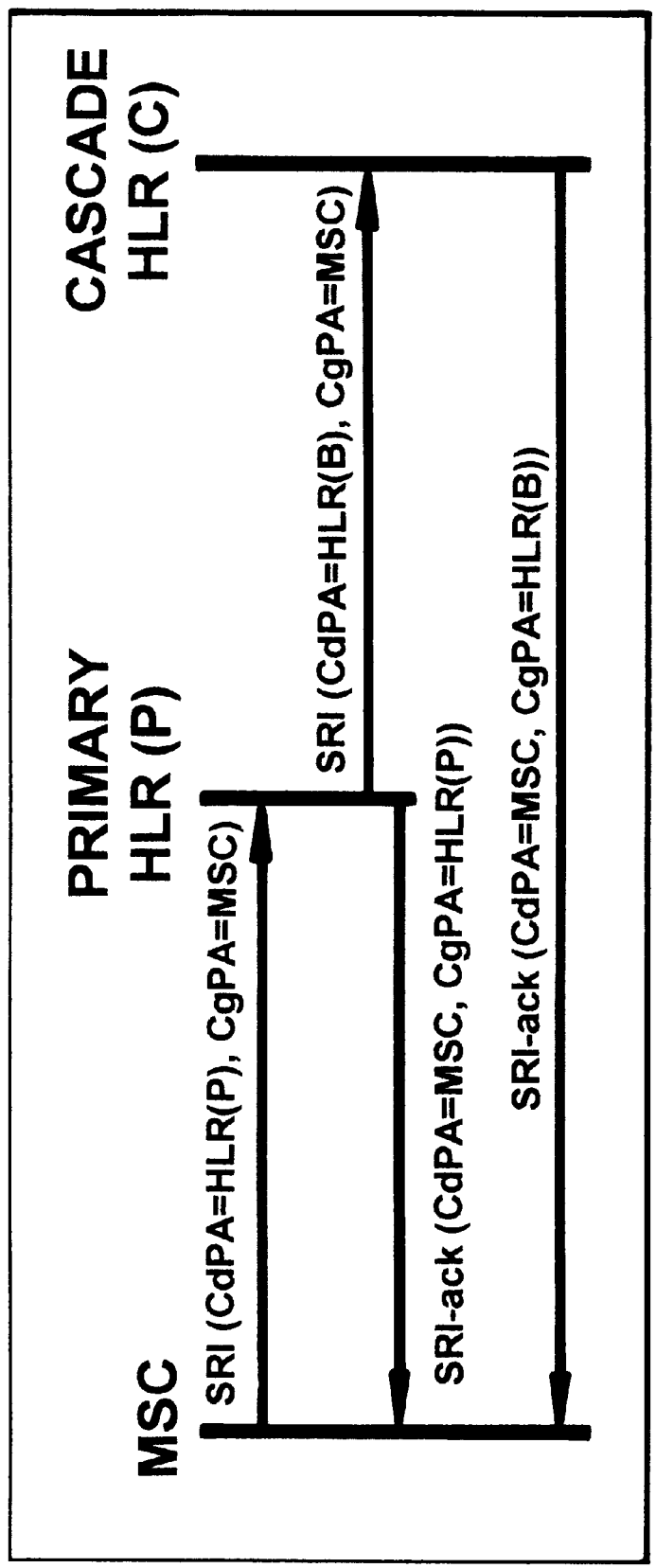
FIG. 5 illustrates in general schematic form a messaging sequence between an MSC and the home location registers.
Figure 6A:
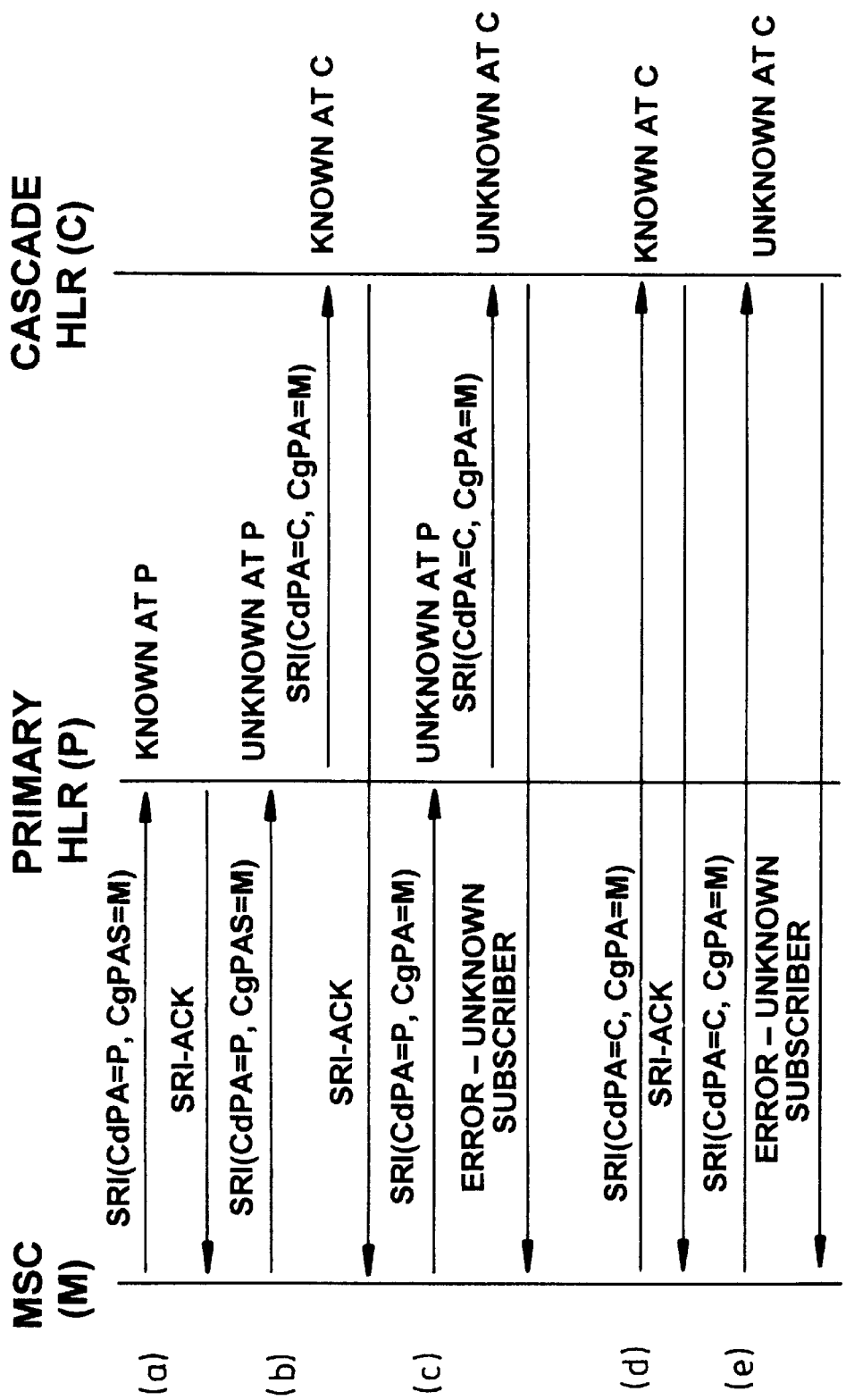
FIG. 6a illustrates the message sequencing between the MSC and the home location registers of the system of FIG. 1 for MSC originated requests.
Figure 6B:
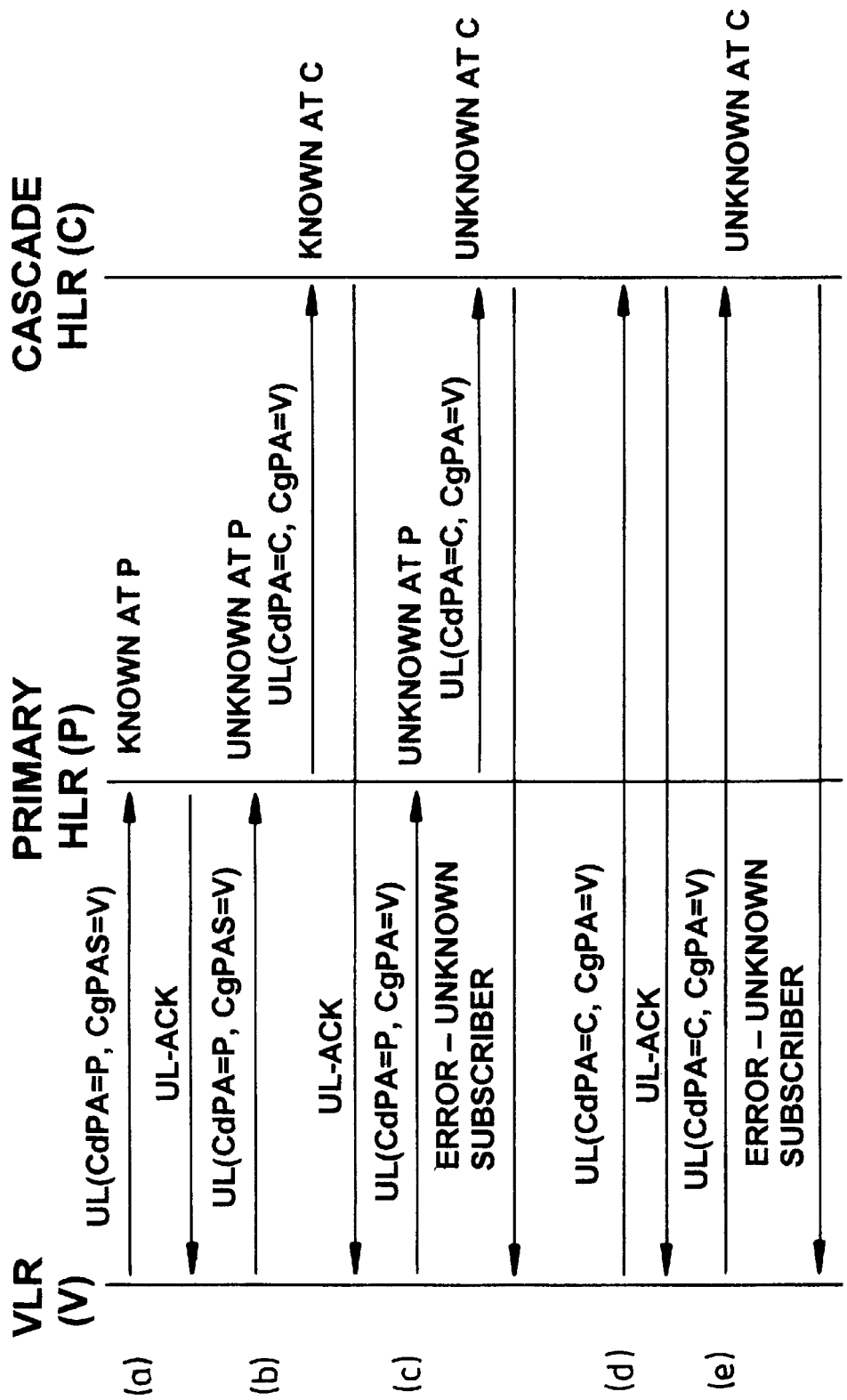
FIG. 6b illustrates the message sequencing between the MSC and the home location registers of the system of FIG. 1 for VLR originated requests.

FIGS. 3 and 4 illustrate the processing logic of the primary and cascaded home location registers respectively and FIGS. 5, 6a and 6b illustrate the corresponding messaging sequence between the MSC or the VLR and the home location registers. Referring to these figures, the message or request from the MSC includes the subscriber's unique international mobile subscriber identity or IMSI, the calling party address (CgPA) of the MSC and the called party address (CdPA) of the primary home location register. The primary home location register, on receiving this request, places it in a queue for processing. Incoming requests are processed up to the point at which the subscriber's identity can be verified. If verification is achieved then processing of the request is continued and an acknowledgement message is returned to the originating MSC. If however the subscriber identity cannot be verified, then processing of the request is terminated and the party processed request message is reassembled into its original form. In a preferred embodiment, the HLR recovers the partially decoded TCAP message which is placed on the application entity (AE) work queue and which will normally be discarded when the TCAP components have been decoded. The partially decoded message is placed in the DTP(decode_tcap_parms) which is normally passed in GSM_MAP_INCOMING_MSG_ PROC. This ensures that the data is linked with the new transaction, that the data is valid only for the duration of the transaction, and that there is no global interface change.

FIG. 6a illustrates the messaging sequence for MSC originated requests.

Using "SendRoutingInformation" as an example of MSC originated requests carrying the subscriber's MSISDN, the messaging diagram of FIG. 6a illustrates the following scenarios:

(a) request routed to primary HLR (P), subscriber known at primary HLR.
(b) request routed to to primary HLR, subscriber unknown to primary HLR, known at cascaded HLR (C).
(c) request routed to primary HLR, subscriber unknown to primary HLR, unknown at cascaded HLR.
(d) request routed to cascaded HLR, subscriber known at cascaded HLR.
(e) request routed to cascaded HLR, subscriber unknown at cascaded HLR.

FIG. 6b illustrates the messaging sequence for VLR originated requests.

Using "UpdateLocation" as an example of VLR originated requests carrying the subscriber's IMSI, the messaging diagram of FIG. 6b illustrates the following scenarios:

(a) request routed to primary HLR (P), subscriber known at primary HLR.
(b) request routed to to primary HLR, subscriber unknown to primary HLR, known at cascaded HLR (C).
(c) request routed to primary HLR, subscriber unknown to primary HLR, unknown at cascaded HLR.
(d) request routed to cascaded HLR, subscriber known at cascaded HLR.
(e) request routed to cascaded HLR, subscriber unknown at cascaded HLR.

The reassembled request is allocated the called party address of the cascaded home location register and is routed to that register for processing. As discussed above, once the request has been re-routed, the primary home location register is no longer involved in the transaction.

Figure 7:
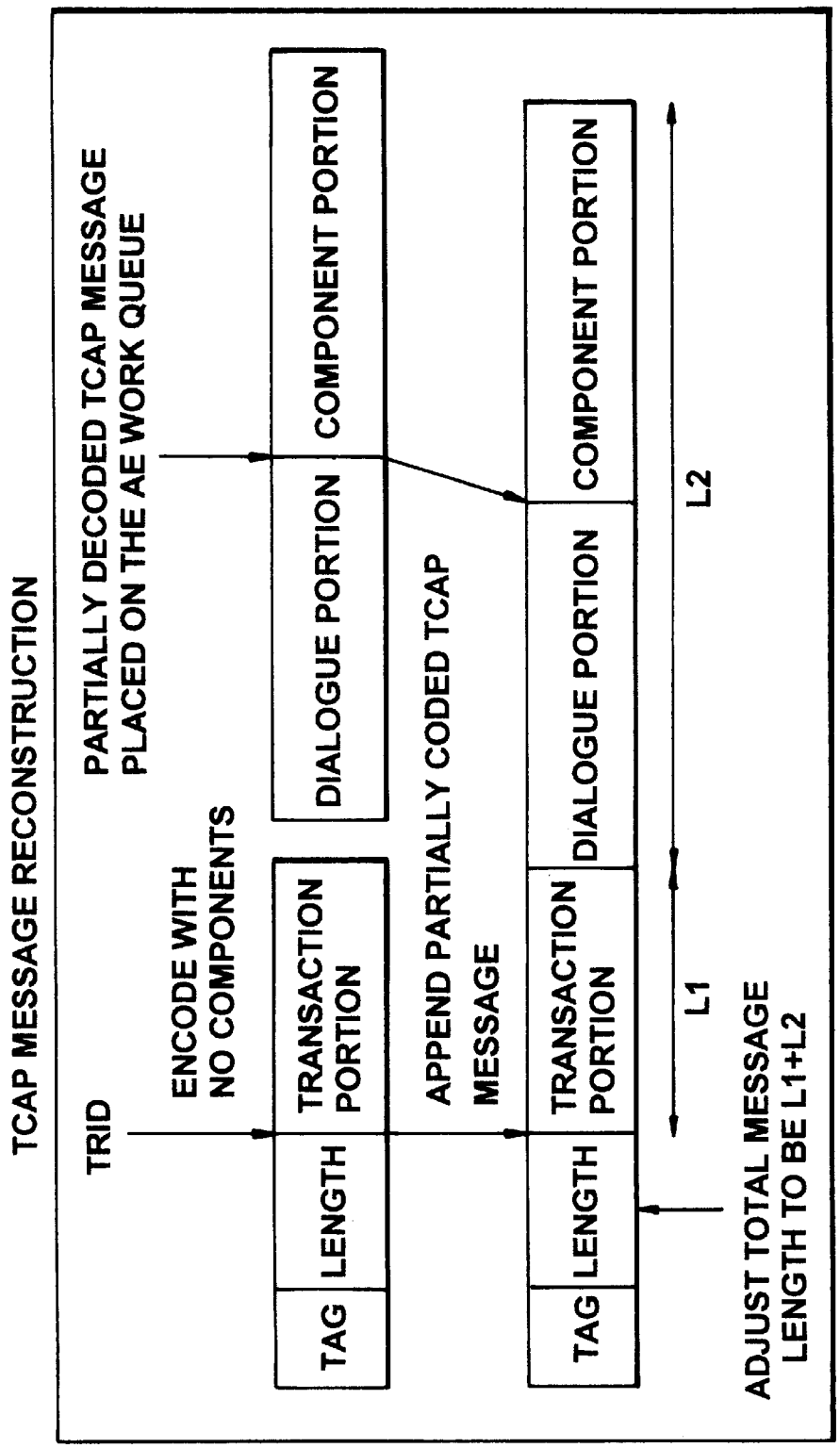
FIG. 7 illustrates TCAP message reconstruction in the system of FIG. 1.

The TCAP message reconstruction procedure is illustrated in FIG. 7. Once the service engine has determined that message re-routing is required, it invokes the MAP_TCAP interface (MTI) passing the partially decoded TCAP message and the subscriber's correlation identifier (CID). For MTI, the CID is in fact the transaction identifier (TRID). The following actions are performed to reconstruct the original message and send it to the cascaded HLR.

1. Gain access to the ASE control block (ACB) using the TRID. This contains:
   the originator's transaction identifier (TRID)
   the originator's calling party address (CgPA)
2. Re-encode the TCAP transaction portion using the originator's TRID and no components.
3. Append the partially decoded message to the new TCAP header and adjust the message length (header position 1).
4. Build the network address of the cascaded HLR using the global title digits stored in the GHLRPARM table. This stage is performed when the digits are data-filled in the GHLRPARM table.
5. Assign the calling party address (CdPA) as that of the originating node.
6. Assign the called party address (CgPA) as that of the cascaded HLR.
7. Send the TCAP message via SCCP.
8. De-allocate the transaction resources and end the transaction.

On receipt by the cascaded home location register, the request is queued for processing and verification of the subscriber identity is attempted. If verification is achieved, then processing of the request is continued and an acknowledgement message is returned to the originating MSC. If however the subscriber identity cannot be verified, then this indicates either a system error or that the subscriber has not been authorised to have access to the system. In that event, an 'unknown subscriber' error message is returned to the originating MSC.

Once communication has been established between the cascaded home location register and an MSC, further messages from that MSC relating to that transaction can be routed directly to the cascaded home location register.

Figure 8:
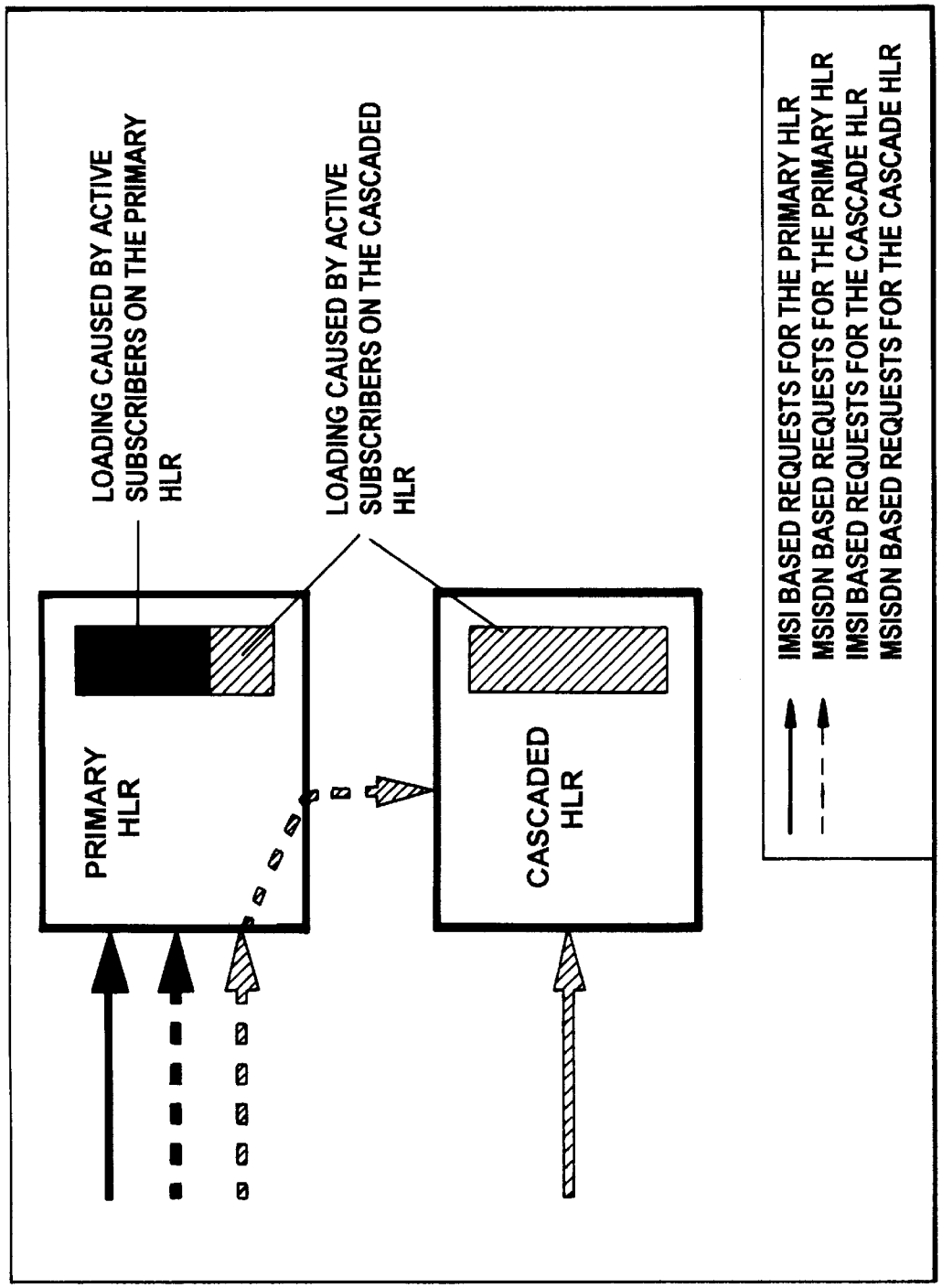
FIG. 8 illustrates a method for load sharing between the primary and cascaded home location registers of FIG. 1.

Referring now to FIG. 8, this illustrates a method of load balancing between the primary and cascaded home location registers. The real time loading of a home location register is a function of the number of active subscribes served and the average transaction profile of those subscribers. Since the primary home location register is handling not only the processing of requests for its own subscribers but also the re-routing of requests to the cascaded home location register, it should not be required to handle as many active subscribers as the cascaded home location register. If the primary home location register becomes overloaded, then it will prevent requests from reaching the cascaded home location register. Thus to optimise the total subscriber capacity of the system, the relative numbers of subscribers served by the two home location registers should be adjusted so that their real time loading is substantially equal.

In a modification of the system, subscribers can be allocated to one or other of the home location registers based on their historical activity profile. Thus, subscribers who are involved in a large number of calls can be allocated to the primary home location register and those involved in few calls can be allocated to the cascaded home location register. In this way most of the request processing is performed by the primary home location register, i.e. only a small number of requests will be forwarded to the cascaded home location register, and the average time for processing requests is thus minimised.

Figure 9:
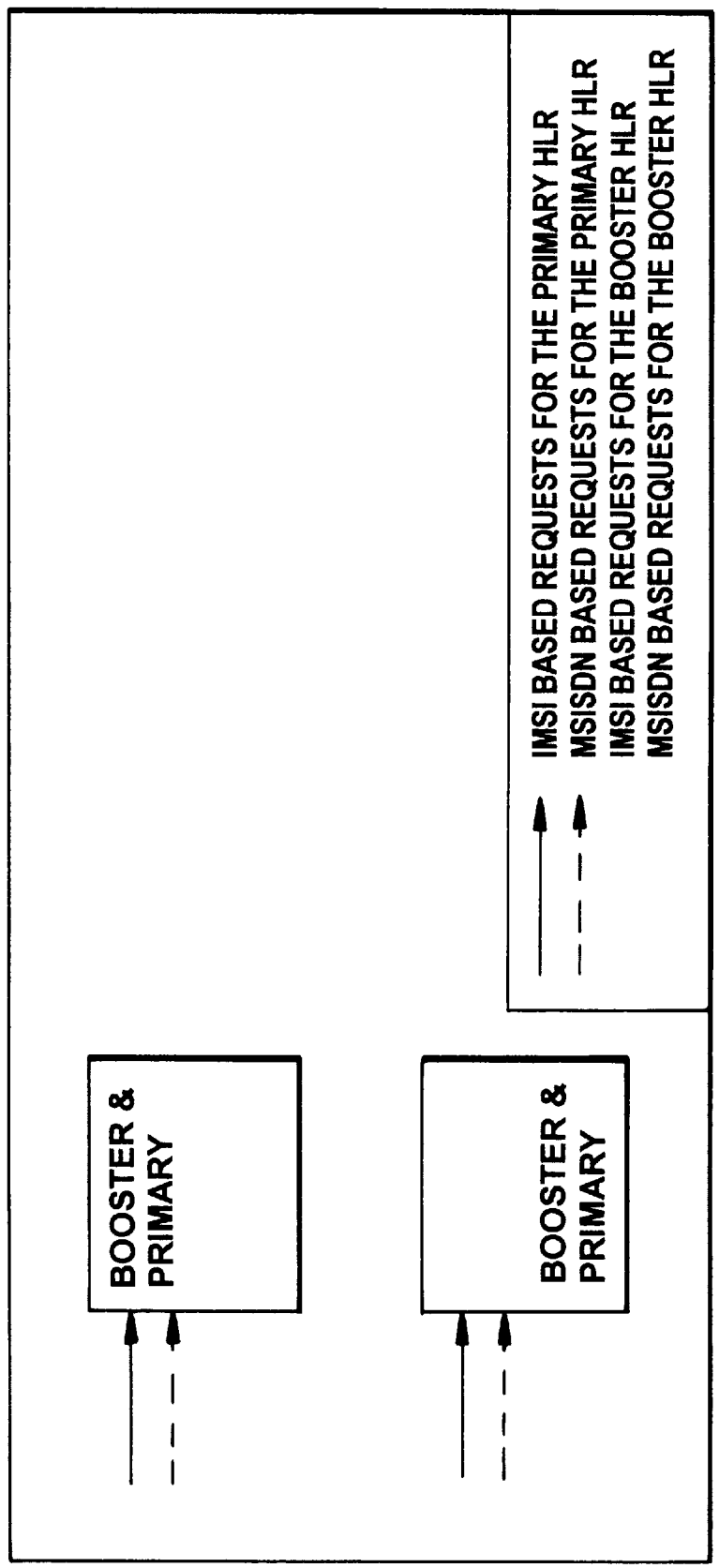
FIG. 9 illustrates an alternative embodiment incorporating a pair of mutually boosted HLRs.
Figure 10:
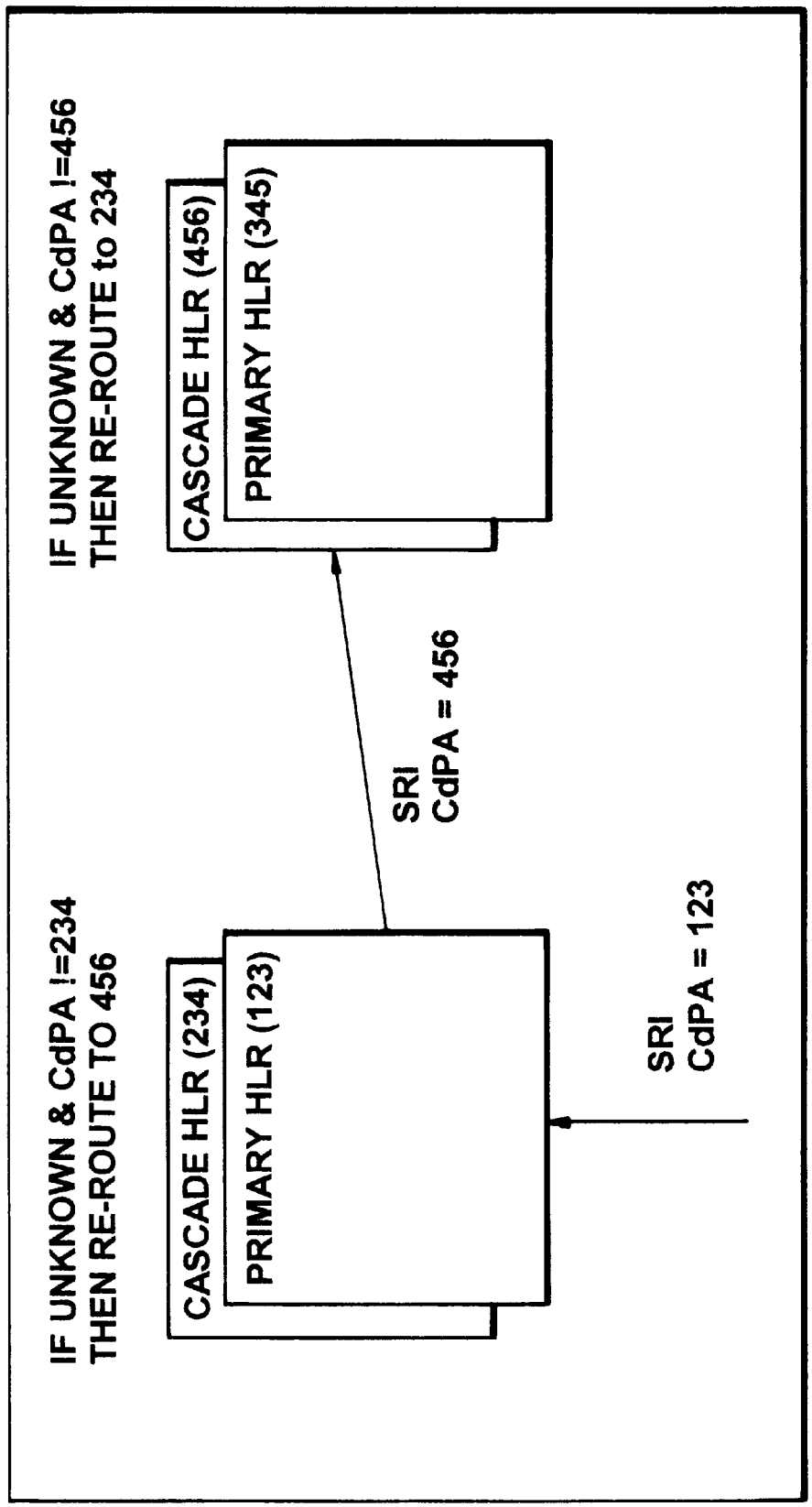
FIG. 10 illustrates the use of a dual GT number to control message re-routing between the HLR pair of FIG. 9.

In a further embodiment, a pair of mutually boosted HLRs may be provided, this arrangement being illustrated in FIGS. 9 and 10. As each HLR 81*a*, 81*b* functions both as a primary and as a cascaded in this arrangement, it is necessary to provide some means of identifying re-routed requests so that requests for unknown subscribers are not perpetually bounced back and forth between the two HLRs, i.e. a request is re-routed only once. There are a number of options for achieving this identification. A marker may be added to re-routed requests, or the originating point code of the other nodes may be used to identify the source of the message. In a preferred arrangement, re-routed messages are identified by sending them to a different GT (global title) address on the same HLR node, this procedure being illustrated in FIG. 10. In this arrangement, intermediate nodes route on point code only so that the global title is preserved.

It will be appreciated that although the technique has been described with particular reference to the GSM system and its associated protocols, it is by no means limited to that system but is of general application to cellular communications systems and to integrated mobile/fixed systems.

What is claimed is:

1. A method of processing subscriber information requests in a cellular communications network incorporating a first, primary home location register and a second, auxiliary home location register, each said home location register providing data storage exclusively for a respective set of subscribers, each said subscriber being allocated to either one or the other of the primary and auxiliary home locations registers, the method including routing every said request directly to the primary home location register irrespective of which of the primary or auxiliary home location registers contains data relating to the particular subscriber for whom the request is being made, responding to the request from the primary home location register to the request when the subscriber data relating to that request is stored on the primary home location register, and, when the subscriber data is not stored on the primary home location register, forwarding the request from the primary home location register to the auxiliary home location register so as to respond to that forwarded request directly from the auxiliary home location register.

2. A method as claimed in claim 1 wherein communication with the home location registers is effected from a mobile switching centre via a fixed network.

3. A method as claimed in claim 2, wherein the fixed network employs common channel signalling, and wherein all said requests are routed via a point code allocated to the first home location register.

4. A method as claimed in claim 3, wherein, after a first response in a transaction from a said further home location register, further messages relating to the same transaction are routed directly to the said further home location register.

5. A method as claimed in claim 4, wherein the relative numbers of subscribers allocated to the first or to the one or more further home location registers are adjusted whereby to provide substantial balancing of the workloads of the respective registers.

6. A method as claimed in claim 5, wherein each said request re-routed from the first to a said further home location register is provided with an indicator that the request has been re-routed.

7. A method as claimed in claim 6, wherein rerouting of a request to a said further home location register is effected from the global title of that further home location register.

8. A method as claimed in claim 6, wherein said first and one said further home location registers form a mutually boosting pair.

9. A cellular mobile communications system incorporating a first, primary home location register and a second, auxiliary home location register, each said home location register providing data storage exclusively for a respective set of subscribers, each said subscriber being allocated to either one or the other of the primary and auxiliary home location registers, wherein the system is arranged to route every said request directly to the primary home location register irrespective of which of the primary or auxiliary home location registers contains data relating to the particular subscriber for whom the request is being made, wherein the primary home location register incorporates means for responding to the request when the subscriber data relating to that request is stored on the primary home location register and means for forwarding the request from the primary home location register to the auxiliary home location register when the subscriber data for that request is not stored on the primary home location register so as to respond to that forwarded request directly from the auxiliary home location register.

10. A system as claimed in claim 9, wherein communication with the home location registers is effected from a mobile switching centre or a visitors location register via a fixed network.

11. A system as claimed in claim 10, wherein the mobile switching centre has means for attaching to every request message a signalling point code corresponding to the network address of the first home location register.

12. A system as claimed in claim 11, wherein said first and a said further home location registers form a mutually boosting pair.

* * * * *